Jan. 1, 1957  J. S. KUSLICH  2,775,839
FISHING LURE WITH UP AND DOWN MOTION
Filed Sept. 7, 1955  2 Sheets-Sheet 1
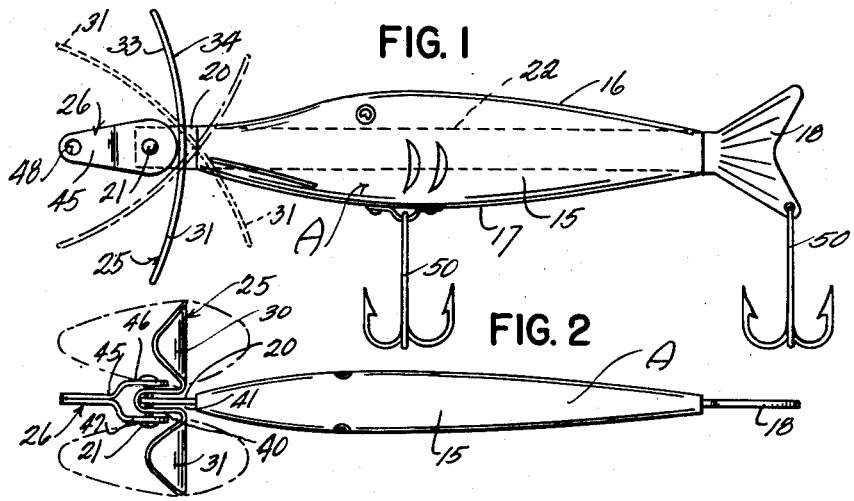
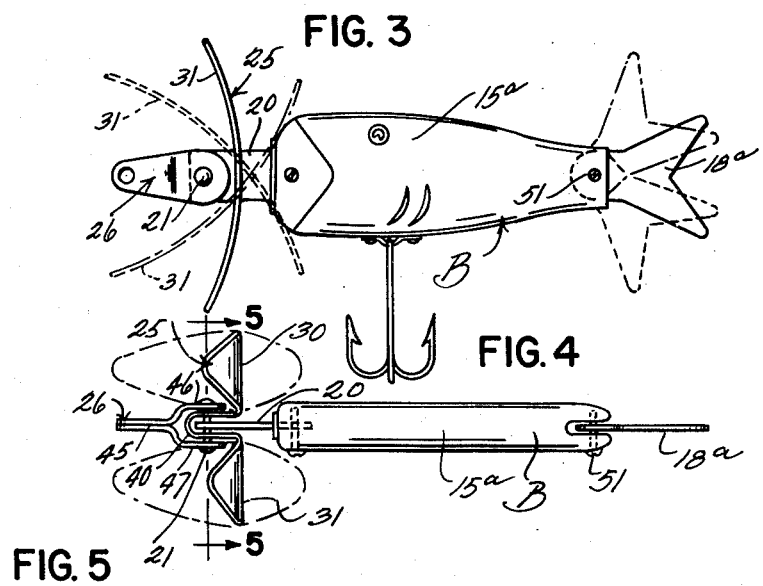
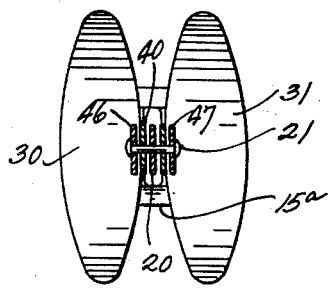
INVENTOR
John S. Kuslich
BY
ATTORNEYS

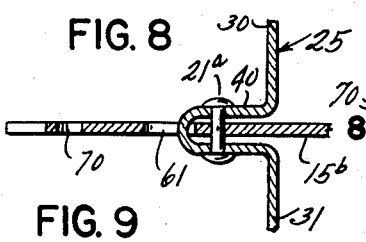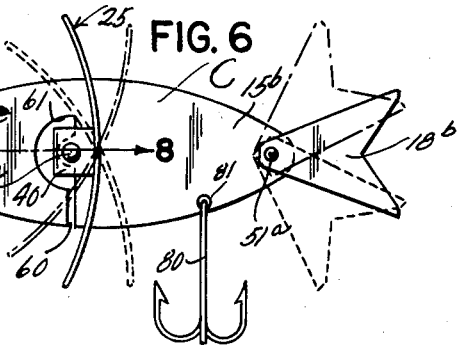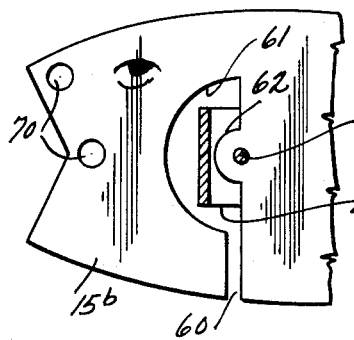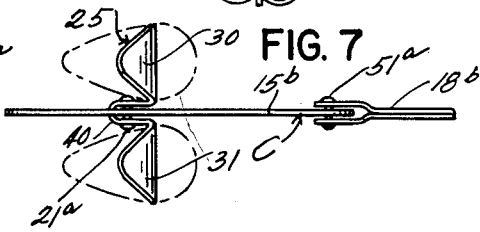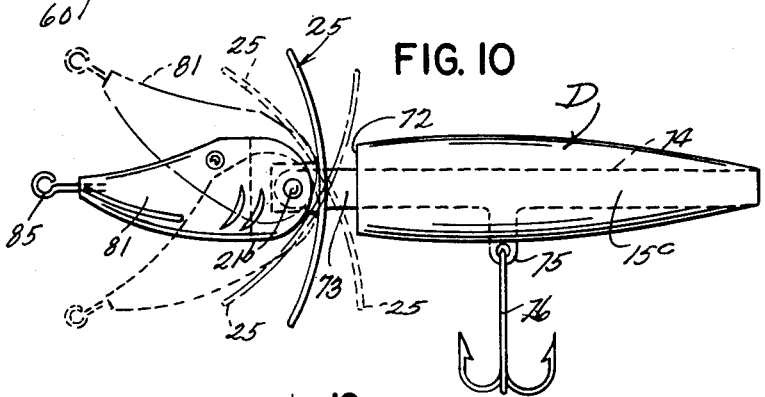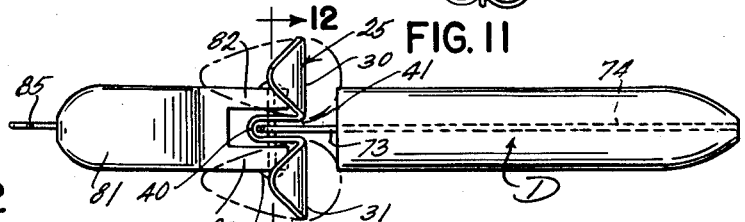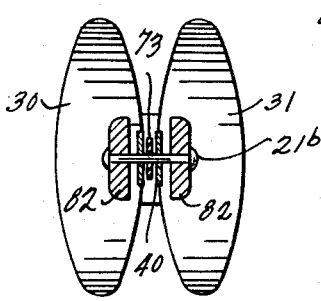

United States Patent Office 2,775,839
Patented Jan. 1, 1957

2,775,839

FISHING LURE WITH UP AND DOWN MOTION

John S. Kuslich, St. Paul, Minn.

Application September 7, 1955, Serial No. 532,921

13 Claims. (Cl. 43—42.03)

This invention relates to improvements in fishing lures.

The primary object of this invention is the provision of a fishing lure which when trolled through the water will travel with an up and down motion, in contradistinction to the sidewise action of conventional lures.

It is known to provide fishing lures with deflecting plates capable of producing a diving or a rising action when trolled through water, but so far as I know such lures are not capable of giving a vertical undulating action. For the most part the deflecting plates of such lures are under the direct connection and control of the fishing line or there is some obstruction which limits the deflecting plate to either a rising or a diving action. It is a purpose of the present lure to give a rather symmetrical rise and fall action to the lure as it is trolled through the water by means of unique deflecting vanes which oscillate in balanced action through predetermined angles.

It is a further object of this invention to provide a fishing lure having deflecting vanes or blades which swing freely as the lure is moved through the water, without obstruction so far as direct line pull forces are concerned. In this lure, the line tie is separate and extended forwardly from the pivotal mounting of the deflector in order that the latter may swing up and down without resistance being imposed thereupon due to lure line connection. Thus, even a steady pull upon the line will enable the deflector to impart an up and down motion to the lure. The deflector blades are evenly balanced centrally between their tips on a horizontal axis and are therefore very sensitive to movement for producing an up and down motion of the lure as it is trolled through the water.

Other objects and advantages of this invention will be apparent during the course of the following detailed description.

In the accompanying drawings, forming a part of this specification, and wherein similar reference characters designate the corresponding parts throughout the several forms of the invention:

Figure 1 is a side elevation of one form of lure.

Figure 2 is a plan view of the lure of Figure 1.

Figure 3 is another form of lure.

Figure 4 is a plan view of the lure of Figure 3.

Figure 5 is a cross sectional view taken substantially on the line 5—5 of Figure 4, and more particularly showing the deflecting vanes.

Figure 6 is a side elevation of another form of lure, principally utilizing a flat plate as the body portion of the lure.

Figure 7 is a plan view of the lure of Figure 6.

Figure 8 is an enlarged cross sectional view taken substantially on the line 8—8 of Figure 6.

Figure 9 is an enlarged fragmentary view, partly in section, of the fore end of the body portion of the lure of Figure 6.

Figure 10 is a side elevation of another form of lure.

Figure 11 is a plan view of the lure of Figure 10.

Figure 12 is a cross sectional view taken substantially on the line 12—12 of Figure 11.

In the drawings, wherein for the purpose of illustration are shown various forms of the invention, the letters A, B, C and D may generally identify the lures of Figures 1, 3, 6 and 10 respectively.

Referring to the form A, the same includes a streamlined body portion 15, simulating a fish. It has convexed top and bottom edges 16 and 17 respectively converging toward the extremity ends of the body. At the fore end of the body 15 a rigid flat extension 20 is provided having a transverse opening therein for rotatably receiving an axle or pin 21 rotatable therein. This extension 20 is part of a strip 22 which extends lengthwise through the body 15, terminating at its rear end in a flat tail 18. On the pin 21 is oscillatively mounted a deflecting vane structure 25 and also a line connecting member 26. The parts 25 and 26 are independently pivoted on the same pin 21. In lieu of the member 26 a conventional line connecting snap may be used, which itself may form part of pin 21.

Referring to the deflector construction 25, the same includes a pair of concavo convex deflector blades or vanes 30 and 31, of the same size. These vanes are elongated in a vertical direction and their concaved surfaces 33 face forwardly; their convex surfaces facing rearwardly. Vanes 30 and 31 from a front view are of elongated oval shaped formation (see form of lure in Figure 5); the widest part of the same being midway between the ends, and therefrom the marginal edges convergently tapering convexly to their extreme ends, which are also convexly rounded. Blades 30 and 31 are connected by a U-shaped forwardly extending bight portion 40, the front surface of which is convexed. The recess at 41 receives the pivot extension 20 therein. Openings are provided in this U-shaped extension 40 for receiving the pivot pin 21, as shown in the form of invention in Figure 5.

The line connecting member 26 may be a conventional snap connector, or, as shown, may include a forwardly extending shank 45 bifurcated at its rear end to provide arms 46 and 47 which are transversely apertured for receiving the pivot pin 21 as a mounting axle. The fore end of the shank 45 may be provided with an opening 48 for receiving a swivel or to which a line may be directly connected. The tail and body portions of the lure A may receive swinging gang hooks 50, as shown in Figure 1.

In the form of invention shown in Figure 3 the body portion 15ª may be of a different shape than the body portion 15 of the form of invention A. The same numerals have been given to the form of invention B, so far as the extension 20 and the deflector construction 25 are concerned, as above given for the form of invention A. The tail section 18ª of the form of invention B is pivoted to the rear of the body 15ª, upon a pin or screw 51, for swinging action in a vertical plane. Cooperative action of the oscillating deflector 25 and the vertical swinging tail section 18ª results during the rise and fall of the lure as it is trolled through water.

In the form of lure C the main body portion 15ᵇ comprises a flat metal or plastic plate, without appreciable thickness, but the upper and lower surfacing may be convexed with decreased height toward the front and rear ends. The vane structure 25 of the form of invention C is the same as the vane construction 25 in the form of invention A, and the same reference characters apply to both forms. The application of the vane structure upon the body 15ᵇ in lure C is substantially different from the application of the vane structures in the forms of invention A and B. To that end, the body 15ᵇ forwardly of the midway point between the ends of the body 15$^b$ is vertically slotted at 60, from the lower edge thereof, and widened upwardly in the shape of a half moon, at 61, to enable the application of bight portion 40 upon the body 15$^b$. A semi-circular projection 62 is integral with the body portion 15$^b$ and projects into the recess 61 part way and there receives a pivot pin 21$^a$, upon which the leg portions of the bight 40 are pivoted as an axis. On the rear the body portion 15$^b$ is provided with a vertical oscillatively mounted tail section 18$^b$, pivoted upon a pin 51$^a$. It is to be noted that the blades 30 and 31 are mounted at opposite sides of the flat body portion 15$^b$ and entirely laterally thereof. The body portion 15$^b$ at its fore end may be provided with line or swivel connecting openings 70, as desired, although preferably one of the same is located directly on the longitudinal center line of the body portion 15$^b$ which intersects the pin 21. They are forward of the pivot 21$^a$.

In the form of lure D the main portion 15$^c$ is elongated and has a stub face 72 from which an extension 73 projects. This extension 73 is part of a strip 74 which runs longitudinally through the body portion 15$^c$. This strip may have a depending lug 75 to which a gang hook 76 may be connected.

The vane structure 25 in the form of invention D is the same as the construction of the vane 25 for the form of invention A and the same reference characters have been applied thereto. The bight portion 40 is pivoted to the extension 73 upon a pin 21$^b$. The head section 81 of the lure D is bifurcated at its rear end, the spaced extensions 82 receiving the portion 40 of the vane 25 therein. These leg portions 82 are provided with openings for attachment to the ends of the pin 21$^b$. Thus, the head section 81 is pivoted upon the pin 21$^b$ as an axis. It may simulate the head of a fish and gives a vertical nodding action within the limits shown by the dot and dash lines in Figure 10 of the drawings. The fore end of the head section 81 may be provided with a screw eye 85 for connection with a swivel or line.

It will be noted that the deflector structures in the forms of invention A, B, C and D are pivoted midway between the upper and lower ends of the blades 30 and 31, and forwardly of the concave surfacing 33. This arrangement permits of a uniform free vertical oscillation or swinging action of the vane structure as the body of the lure is trolled or moved through the water. The action takes place because of variations in line pull and current eddying. The limits of movements of the concavo convex blades 30 and 31 are shown in dot and dash lines in Figures 1, 3, 6 and 10 of the drawings, and for the forms of invention B and C the tail sections have a cooperating movement. For the form of invention D the head 81 will have a vertical nodding movement, as the lure travels through water, although this movement will not respond in synchronism to movement of the blade construction 25 because the line swivel or line is directly connected to the fore end of the head 81. This will interfere to some extent with the nodding movement of the head 81, but will not interfere with the uniform oscillation of the vane structure 25 for the purpose of giving the lure up and down motion at it is drawn through the water.

From the foregoing it will be apparent that the balanced mounting of the deflecting blades or vanes enable them to have a free up and down swinging action independent of any resistance imposed thereon as a result of line connection or pull. The line connection is located forwardly of the vane structure permitting a swinging action of the scoops instead of a line pull imposed tilting action. It will be noted that the upper and lower portions of the vanes are of the same contour, shape and size.

The lures may be constructed of wood, plaster, metal or any desired and suitable material.

Various changes in the shape, size and arrangement of parts may be made to the form of invention herein shown and described without departing from the spirit of the invention or scope of the claims.

I claim:

1. As an article of manufacture a fishing lure comprising a main body portion, a deflector member freely and unobstructedly pivoted on a transverse axis upon the forward end of said body for free and unobstructed fore and aft oscillation and swinging action upon its pivot axis, and a tail section pivoted upon the rear end of the body portion on a horizontal axis for swinging in a vertical plane in synchronism with the oscillation action of the deflector member.

2. As an article of manufacture a fishing lure comprising an elongated main body portion and a generally vertically arranged deflector pivoted on a transverse axis upon the fore end of said body for free and unobstructed fore and aft oscillation upon its pivot axis, said deflector having substantially equal and similarly shaped portions extending above and below its pivot axis and which portions respectively extend appreciably above and below the top and bottom surfaces respectively of said body portion.

3. As an article of manufacture a fishing lure comprising an elongated body portion, and a deflector blade construction freely pivoted for swinging action on a transverse axis on the fore end of said body portion, said deflector construction comprising a pair of rigidly connected vertically elongated and laterally narrower blades having concaved forward surfaces lying in the same general plane.

4. As an article of manufacture a deflector vane construction for fishing lures comprising a pair of elongated deflector blades lying substantially in the same plane and being relatively connected together intermediate the upper and lower ends thereof by a forwardly projecting transversely apertured extension.

5. A vane as described in claim 4 in which the extension is generally of U-shaped formation and which holds said blades in relatively spaced relation, said blades being concavo convexed lengthwise.

6. A fishing lure comprising a flat platelike body portion vertically slotted upwardly from the lower margin thereof and defining a transverse enlarged opening at the upper end thereof within the confines of the body portion, and a deflector comprising a pair of vertically elongated blades connected by a bite portion and which blades are disposed one at one side and the other at the other side of the body portion, said bite portion having a pivot connection upon said body portion and transversely extending across the enlarged opening whereby to permit oscillative movement of said blades above and below the pivot in a fore and aft direction.

7. A fishing lure as described in claim 6 in which the flat platelike body portion of the lure is provided with a tail section pivoted on a transverse axis for movement in a vertical plane.

8. A fishing lure comprising an elongated body portion having at the forward end thereof a deflector freely pivoted on a transverse axis for movement in a fore and aft direction, the deflector having portions evenly extending above and below said pivot axis, and a head section independently pivoted on the forward end of said body portion on the same pivot axis as said deflector for movement in a vertical plane.

9. A fishing lure comprising a main body portion, and a deflector freely pivoted on a transverse axis upon the forward end of the body for free and unobstructed fore and aft oscillation upon said pivot axis, said deflector construction having substantially evenly balanced portions above and below the pivot axis thereof.

10. A fishing lure as described in claim 9 in which the deflector comprises portions at each side of the longitudinal axis of the body portion laterally projecting beyond the outer side surfacing of said lure body portion.

11. A lure as described in claim 9 in which a line con-